US012642195B2

(12) United States Patent
Cao et al.

(10) Patent No.: US 12,642,195 B2
(45) Date of Patent: Jun. 2, 2026

(54) SYSTEMS AND METHODS FOR RECYCLING END-OF-USE TEXTILES INTO SECOND GENERATION TEXTILES

(71) Applicants: Huantian Cao, Newark, DE (US);
Kelly Cobb, Newark, DE (US);
Hongqing Shen, Newark, DE (US)

(72) Inventors: Huantian Cao, Newark, DE (US);
Kelly Cobb, Newark, DE (US);
Hongqing Shen, Newark, DE (US)

(73) Assignee: UNIVERSITY OF DELAWARE,
Newark, DE (US)

( * ) Notice: Subject to any disclaimer, the term of this patent is extended or adjusted under 35 U.S.C. 154(b) by 0 days.

(21) Appl. No.: 18/765,772

(22) Filed: Jul. 8, 2024

(65) Prior Publication Data

US 2025/0008884 A1      Jan. 9, 2025

Related U.S. Application Data

(60) Provisional application No. 63/512,155, filed on Jul. 6, 2023.

(51) Int. Cl.
| | |
|---|---|
| *A01G 13/32* | (2025.01) |
| *A01G 13/35* | (2025.01) |
| *C09K 17/52* | (2006.01) |

(52) U.S. Cl.
CPC ............. *A01G 13/35* (2025.01); *A01G 13/32* (2025.01); *C09K 17/52* (2013.01)

(58) Field of Classification Search
CPC ........ D04H 18/02; D04H 18/00; D04H 17/00; D04H 1/46
See application file for complete search history.

(56) References Cited

U.S. PATENT DOCUMENTS

| | | | | | |
|---|---|---|---|---|---|
| 3,394,043 | A | * | 7/1968 | Mitchell | .................. D04H 1/48 |
| | | | | | 428/95 |
| 3,684,601 | A | * | 8/1972 | Hayward | ................ B32B 27/30 |
| | | | | | 428/297.4 |

(Continued)

OTHER PUBLICATIONS

Advancing Sustainable Materials Management: 2018 Fact Sheet: Assessing Trends in Materials Generation and Management in the United States, U.S. Environmental Protection Agency, (Dec. 2020), pp. 1-25.

(Continued)

*Primary Examiner* — Jillian K Pierorazio
(74) *Attorney, Agent, or Firm* — Buchanan Ingersoll & Rooney PC

(57) ABSTRACT

A process for making a textile from a feedstock comprising a quantity of post-consumer apparel, each item of apparel having a desired textile composition and devoid of non-textile materials, including shredding the feedstock to obtain textile shreds, providing the textile shreds as a component in at least a first layer of a plurality of stacked layers comprising at least a second layer of supporting material, and feeding the plurality of stacked layers through a needle-felting machine in a plurality of passes, including at least one pass in each of a plurality of different 90-degree offset orientations. The textile shreds, or a mixture of the textile shreds and new textile fibers comprising no more than 15%-20% new textile fibers, may be carded with a carding machine to form a batting. Products made by the process may include a 100% cotton mulch mat for agricultural use.

16 Claims, 6 Drawing Sheets

(56) References Cited

U.S. PATENT DOCUMENTS

| | | | | |
|---|---|---|---|---|
| 4,457,055 | A * | 7/1984 | Ambrose | D04H 18/02 28/111 |
| 5,312,660 | A * | 5/1994 | Morris | D04H 1/498 87/8 |
| 5,662,855 | A * | 9/1997 | Liew | D04H 18/02 264/258 |
| 2004/0224589 | A1* | 11/2004 | Bacon | D04H 18/02 442/407 |
| 2012/0052760 | A1* | 3/2012 | Doyle | B32B 37/24 428/297.4 |
| 2016/0194795 | A1* | 7/2016 | Pryne | D04H 3/105 19/302 |
| 2020/0276788 | A1* | 9/2020 | Rees | B32B 5/026 |
| 2022/0136148 | A1* | 5/2022 | Lund | D04H 1/498 442/392 |
| 2022/0378130 | A1* | 12/2022 | Brandt | D04H 1/498 |
| 2023/0286248 | A1* | 9/2023 | Hur | B32B 5/022 |
| 2023/0383446 | A1* | 11/2023 | Burns | D04H 1/485 |
| 2024/0279424 | A1* | 8/2024 | Ginting | C08J 11/06 |

OTHER PUBLICATIONS

Materials Market Report, Textile Exchange, (Dec. 2023), pp. 1-75.

Preferred Fiber & Materials Market Report 2021, Textile Exchange, (month unknown 2021), pp. 1-118.

The Commonwealth Club is Decked Out in Denim, Levi Strauss & Co., (Sep. 13, 2017), pp. 1-2.

Abidi, et al., "Accelerated Weathering of Textile Waste Nonwovens Used as Sustainable Agricultural Mulching", Journal of Industrial Textiles, vol. 50, No. 7, (Feb. 1, 2021), pp. 1079-1110.

Ahmad, et al., "Fibers for Technical Textiles", Springer, (Jan. 2020), 228 pages.

Asaadi, et al., "Renewable High-Performance Fibers from the Chemical Recycling of Cotton Waste Utilizing an Ionic Liquid", ChemSusChem, vol. 9, No. 22, (Nov. 23, 2016), pp. 3250-3258.

Cao, et al., "Development and Evaluation of Biodegradable Weed Control Mulch Mats from End-of-Use Cotton Waste", Sustainability, vol. 16, Issue 16, Article No. 7083, (Aug. 18, 2024), pp. 1-16.

Cao, et al., "Development and Research of Sustainable Mulch Mats from End-of-Use Cotton Textiles", International Textile and Apparel Association Proceedings (ITAA), vol. 80, (Jan. 20, 2024), 3 pages.

Danigelis, Alyssa, "Levi Strauss & Co. Introduces Denim Recycling for Consumers", Environment+Energy Leader, (Apr. 22, 2019), 6 pages.

Esteve-Turrillas, et al., "Environmental Impact of Recover Cotton in Textile Industry", Resources, Conservation and Recycling, vol. 116, (Jan. 2017), pp. 107-115.

Haule, et al., "Preparation and Physical Properties of Regenerated Cellulose Fibres From Cotton Waste Garments", Journal of Cleaner Production, vol. 112, Part 5, (Jan. 20, 2016), pp. 4445-4451.

Kader, et al., "Recent Advances in Mulching Materials and Methods for Modifying Soil Environment", Soil and Tillage Research, vol. 168, (May 2017), pp. 155-166.

Kaniz, et al., "Plant Growth-Promoting Rhizobacteria Mediate Soil Hydro-Physical Properties: an Investigation With Bacillus Subtilis and its Mutants", Vadose Zone Journal, vol. 22, Article No. e20274, (Jul. 21, 2023), pp. 1-12.

Lewis, et al., "Closing the Loop: A Scalable Zero-waste Model for Apparel Reuse and Recycling", International Journal of Fashion Design, Technology and Education, vol. 10, No. 3, (Dec. 7, 2016), pp. 353-362.

Liu, et al., "Development of Natural Fiber-based Degradable Non-woven Mulch From Recyclable Mill Waste", Waste Management, vol. 121, (Feb. 15, 2021), pp. 432-440.

Liu, et al., "Multicriteria Optimization of a Novel Degradable Nonwoven Mulch Fabricated from Recycled Natural Fibers Using CV-TOPSIS Technique", Textile Research Journal, vol. 92, Issue 15-16, (May 22, 2021), pp. 2784-2791.

Luo, et al., "Preparation and Characterization of Biodegradable Cotton Mulching Film", Applied Mechanics and Materials, vol. 368-370, (Aug. 30, 2013), pp. 791-794 (5 pages).

Manna, et al., "Effect of Nonwoven Jute Agrotextile Mulch on Soil Health and Productivity of Broccoli (Brassica oleracea L.) in Lateritic Soil", Environmental Monitoring and Assessment, vol. 190, No. 2, Article No. 82, (Jan. 16, 2018), pp. 1-10.

Mansoor, et al., "Polymers Use as Mulch Films in Agriculture-A Review of History, Problems and Current Trends", Polymers, vol. 14, No. 23, Article No. 5062, (Nov. 22, 2022), pp. 1-29.

Ptacek, et al., "Influence of Mulching on Gherkins at Two Levels of Irrigation", Horticultural Science (Prague), vol. 45, No. 3, (Sep. 2018), pp. 139-144.

Ramey, et al., "Relationship of Cotton Fiber Properties to Yarn Tenacity", (Oct. 1977), pp. 685-691.

Restrepo-Osorio, et al., "Agrotextiles and Crop Protection Textiles", Universidad Pontificia Bolivariana Medellín, Colombia, (Mar. 2019), pp. 279-318.

Sarkar, et al., "Effect of Woven Jute Agro Textile Mulch on Soil Health and Productivity of Banana (Musa domestica L.) in New Alluvial Soil", International Research Journal of Pure and Applied Chemistry, vol. 21, No. 3, (Mar. 10, 2020), pp. 1-7.

Sular, et al., "Biodegradation Behaviour of Different Textile Fibres: Visual, Morphological, Structural Properties and Soil Analyses", Fibres and Textiles in Eastern Europe, vol. 27, (Feb. 2019), 12 pages.

Wortman, et al., "Assessing the Potential for Spunbond, Nonwoven Biodegradable Fabric as Mulches for Tomato and Bell Pepper Crops", Scientia Horticulturae, vol. 193, (Sep. 22, 2015), pp. 209-217.

Yasin, et al., "Global Consumption of Flame Retardants and Related Environmental Concerns: A Study on Possible Mechanical Recycling of Flame Retardant Textiles", Fibers, vol. 4, No. 2, Article No. 16, (May 11, 2016), pp. 1-20.

Zheng, et al., "Plant Growth-Promoting Rhizobacteria (PGPR) Reduce Evaporation and Increase Soil Water Retention", Water Resources Research, vol. 54, No. 5, (May 2018), pp. 3673-3687.

* cited by examiner 12
10

12
11
10

24a
22a
20a 26b
24b
22b
20b

SYSTEMS AND METHODS FOR RECYCLING END-OF-USE TEXTILES INTO SECOND GENERATION TEXTILES

CROSS-REFERENCE TO RELATED APPLICATIONS

This application claims priority from U.S. Provisional Application Ser. No. 63/512,155, titled "NOVEL PROCESSES TO RE/MANUFACTURE END OF USE TEXTILES INTO SECOND GENERATION TEXTILES AND PRODUCTS," filed Jul. 6, 2023, incorporated herein by reference.

STATEMENT REGARDING FEDERALLY SPONSORED RESEARCH (IF APPLICABLE)

This invention was made with government support under Grant Number 2236100, awarded by the National Science Foundation. The government has certain rights in the invention.

BACKGROUND OF THE INVENTION

It has been reported that in 2020, the textile and apparel industry produced over 100 million tons of global fiber, and U.S. consumers purchased a total of more than 17 billion garments (an average of 51.8 garments per person). At least one study has shown that compared with 15 years ago, consumers purchase twice the amount of clothing but keep that clothing half as long. The huge amount of textile and apparel production and consumption, along with shorter utilization lifetime, generates a large quantity of textile and apparel post-consumer waste.

Textile recycling includes mechanical, chemical and thermal reprocessing methods of textile waste for use in new textile or non-textile products. Types of recycling include downcycling, wherein the recycled material is of lower value or quality than the original product, and upcycling, in which the product formed from the recycled material is of higher value or quality than the original product. Textile fibers can be produced using chemical and thermal recycling methods. Mechanical recycling shortens the fiber length and lowers fiber quality, which is typically a downcycling process. To avoid downcycling, fabrics can only include up to 20-30% mechanically recycled material so the quality of the fabric is not significantly reduced.

When consumers no longer need a garment, they generally sell, give, or donate it so the garment may be re-used by another person. A study in Edmonton, Canada found that 91% of consumers "always", "almost always" or "usually" donate unwanted clothing. Charity organizations sell about 10-20% of donated clothing in their stores, export about two-thirds of donated clothing to developing countries and send the rest to recycling plants. However, for most second-hand clothing, exporting is just a cheap way to dispose of them. Although the global trade of second-hand clothing has reportedly grown to about $36 billion in trade value as of 2021, an estimated half of that clothing may end up in dumpsites, rivers, or gets burned without energy recovery in the importing countries because of a lack of market value (e.g., sizes do not fit, clothing not suited for the local climate, poor quality, broken, or soiled).

Cotton fiber is the second most widely used fiber in textiles, with a reported global production of 26.2 million tons and a 24.4% textile fiber market share in 2020. Cotton textiles are typically recycled using chemical or mechanical methods. Shredding in mechanical cotton recycling shortens cotton fiber length and reduces fiber quality by decreasing strength and softness, so mechanical recycling is generally applied on pre-consumer cotton textile waste, since post-consumer waste has lower quality from wearing.

Textiles can be recycled through mechanical, thermal, and chemical methods. Mechanical textile recycling includes shredding the fabric into a fibrous form, which can be re-spun into yarn or manufactured into nonwoven textiles. Mechanical recycling is more flexible with respect to fiber content: fabrics made from any fiber type and fiber blend can be shredded and recycled. However, shredding shortens fiber length and reduces fiber quality, so mechanical recycling is generally applied on pre-consumer textile waste, which does not experience wearing and tearing and has higher quality than post-consumer waste. About 95% of recovered fibers through shredding or disintegration are processed into nonwovens rather than re-spun into yarns to be used for new apparel.

Thus, there is still a need in the art for methods to recycle post-consumer cotton textile waste and design and develop high-value, second-generation products.

SUMMARY OF THE INVENTION

Figure 1A:
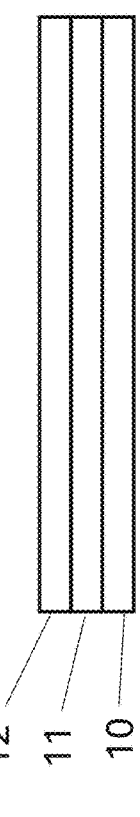
FIG. 1A is a schematic side view of an exemplary 2-layer textile stack relating to an embodiment of the invention.

One aspect of the invention relates to a process for making a textile, the process comprising the steps of (a) obtaining a feedstock comprising a quantity of post-consumer apparel, each item of apparel having a desired textile composition and devoid of non-textile materials; (b) shredding the feedstock (e.g. using a textile shredding machine) to obtain textile shreds; providing the textile shreds as a component in at least a first layer of a plurality of stacked layers comprising at least a second layer of supporting material; and (c)

feeding the plurality of stacked layers through a needle-felting machine in a plurality of passes (i.e. 4 to 40), including at least one pass in each of a plurality of different 90-degree offset orientations. Prior to step (c), the process may include carding the textile shreds, or a mixture of the textile shreds and new textile fibers comprising no more than 15%-20% new textile fibers, with a carding machine 3 to 8 times, to form a batting. In embodiments, the process of obtaining the feedstock comprises obtaining a mixture of post-consumer apparel and sorting the mixture to obtain a fraction having the desired textile composition and removing any non-textile materials from the fraction having the desired textile composition, the non-textile materials including one or more fasteners or decorative hardware. The step of feeding the stacked layers into the needle-felting machine may include turning the stacked layers 90-degrees between each set of subsequent passes.

In embodiments, the plurality of stacked layers further comprised a third fabric layer. In one embodiment, the first fabric layer may comprises a plurality of fabric strips not formed into a batting and the third layer may comprise a fiberweb layer disposed between the first fabric layer and the second layer of supporting material. The supporting layer may comprise a singular piece of fabric, such as a piece of fabric from an end-of-use textile product or a fiberweb. One or more of the stacked layers, including the second layer of supporting material, may comprise cheesecloth.

Another aspect of the invention relates to a textile comprising a product of the process as described above, such as a second generation textile article selected from the group consisting of wearable apparel, a bag, and a case.

Yet another aspect of the invention relates to a method for controlling weed growth and moisture content in an agricultural installation. The method includes the steps of providing a textile that is a product of the process as described above for use as a mulch mat, wherein the desired textile composition comprises 100% cotton; disposing the mulch mat in contact with an upper surface of an area of soil adjacent at least one plant; and allowing the mulch mat to completely biodegrade into the soil after harvesting the plant or one or more portions of the plant.

Still another aspect of the invention relates to a biodegradable mulch mat for controlling weed growth and moisture content in an agricultural installation comprising a needle-felted stack of textile layers, the stack comprising: a supporting layer; a layer comprising at least 80 weight % textile shreds derived from a feedstock comprising post-consumer apparel having a textile composition of at least 80% (in some embodiments, 100%) cotton and devoid of non-textile materials, and no more than 15%-20% new textile fibers, wherein the needle-felted stack is a product of a plurality of passes through a needle-felting machine. The plurality of passes includes at least one pass in each of 4 different, 90-degree-offset orientations. The supporting layer may comprise a singular fabric piece from an end-of-use textile product or a singular fabric piece of cheesecloth. The mulch mat may further include a layer of new fiber batting, such as wherein the supporting layer comprises cheesecloth, the textile shred layer is disposed between the supporting layer and the layer of new fiber batting, and a top layer of cheesecloth is disposed over the layer of new fiber batting.

DETAILED DESCRIPTION OF THE INVENTION

Starting materials for aspects of the invention disclosed herein use end-of-use apparel (in some embodiments, preferably having a high (80% or higher) cotton content). The invention is not limited to any particular material composition (e.g. polyester, nylon, wool, cotton) or blends thereof, although certain embodiments benefit from having a high percentage of cotton, including some applications in which 100% cotton is desired for complete biodegradability. The initial feedstock includes end-of-use apparel deemed unfit for resale (e.g. by local Goodwill stores). In embodiments, the materials may be first sorted into a desired material (e.g. higher than a desired percentage of a certain fiber material, such as cotton, for example, 80%-or-higher cotton) fraction and an undesired material (e.g. less than the desired percentage of the certain fiber, for example <80% cotton) fraction. Non-textile materials such as zippers and buttons (but also including beads, sequins, and any other non-textile hardware having a decorative or functional purpose) were removed from the desired percentage cotton fraction of end-of-use garments. The undesired material fraction was not included in the feedstock for the certain embodiments described herein. In addition to end-of-use apparel, a limited amount of other textile waste (e.g., leftover textile fabrics from school projects and deadstock fabrics) and a very small amount (e.g. up to 15%-20%) of new textile (e.g., cotton fibers, yarns, and threads) of the total feedstock for downstream processing may be used.

Textiles (after removal of non-textile materials) may be shredded by feeding textile scraps from end-of-use garments to a textile shredding machine (e.g. Taskmaster® Model TM8512, Franklin Miller Inc., Livingston, NJ) or shredding by hand (e.g. using scissors). The resulting textile shreds are then ready for use in further textile processing steps as described here.

Batting

One embodiment relates to developing a batting from textile shreds. Materials used in batting may include new cotton sliver, shredded end-of-use cotton garment, and recycled fibers (e.g. acquired as a packaging material, fiber content unknown). Fibers are then carded together on a carding machine (e.g. Strauch (Hickory, NC)) to develop the batting. Carding typically includes making multiple passes through the carding machine, ranging from 3 to 8 times. More carding passes may generate less waste and make a higher quality batting, but generally may take more time. The batting material as described herein above may be generally characterized as a fiberweb, and can serve as an intermediate material (in one or more layers), as a supporting layer (or layers), for needle punched felt nonwoven development, discussed herein later.

Yarn Development

Methods to develop "yarns" from end-of-use garments were also pursued, including pulling yarns out from an end-of-use knitwear garments (e.g. a cotton sweater) and cutting narrow (e.g. ¼ to 1 inch wide) strips of end-of-use textiles. It was found to be generally easier to pull out big denier yarns than small denier yarns from knitwear without breaking the yarns. In one prototype, researchers pulled the yarns out from an end-of-use multi-color cotton sweater to obtain yarns.

In another embodiment, scissors and/or a rag cutter (e.g. Bliss Model A) may be used to cut end-of-use textiles to ¼ to 1-inch-wide strips or ribbons, which may be used as "yarns" in weaving or tufting processes as described herein later. To increase the length of the fabric strips and make "continuous yarns", the fabric strips may be knotted or sewed end-to-end.

Fabric Development

Needle punched felt nonwoven fabrics, woven fabrics, quilted fabrics, and loop tufted fabrics were developed from end-of-use cotton garments and other textile materials.

Needle Punched Felt Nonwoven Fabric

Figure 1B:
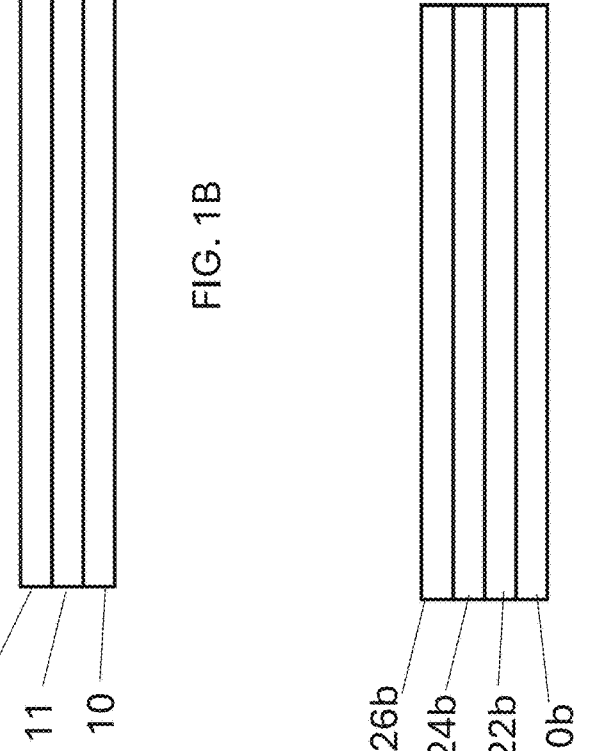
FIG. 1B is a schematic side view of an exemplary 3-layer textile stack relating to one embodiment of the invention.

Needle punched nonwoven fabric was developed using a FeltLOOM® needle felting machine (Model Lexi, Feltloom, Sharpsburg, KY). Exemplary fabric comprised two or three layers of materials, such as depicted in FIG. 1A and FIG. 1B, respectively, is described, but the invention is not limited to any number of layers. In embodiments, the ground (bottom layer 10) fabric may comprise a continuous sheet of fabric cut from an end-of-use garment (i.e. from the front or back of a shirt). Embodiments may feature one of two types of material for top layer 12: (a) the batting material (created by carding shredded end-of-use garments as described herein above); (b) shredded end-of-use textile waste (not formed into a batting). In the textile depicted in FIG. 1B, optional middle layer 11 may comprise textile fiberweb (e.g. recycled fiberweb acquired as a packaging material, or new fiberweb, such as cheesecloth) or the batting material (created by carding shredded end-of-use garments as described herein above) may also be considered a fiberweb. In other embodiments, the bottom layer 10 of the textile structures of FIG. 1A or 1B may comprise a fiberweb (new, recycled, or end-of-use textile batting).

Figure 3C:
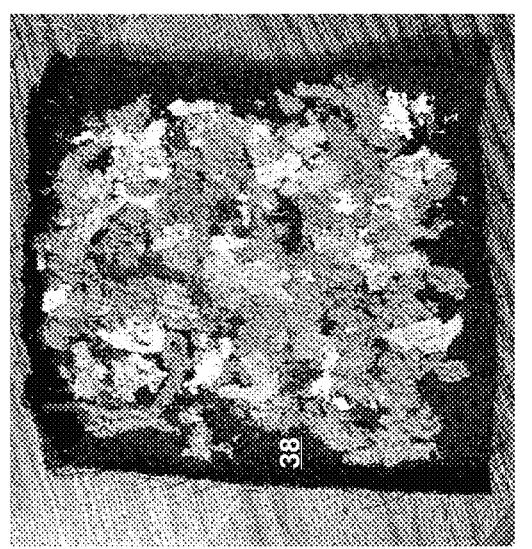
FIG. 3C is a photograph of a third exemplary needle punched nonwoven fabric embodiment.
Figure 3B:
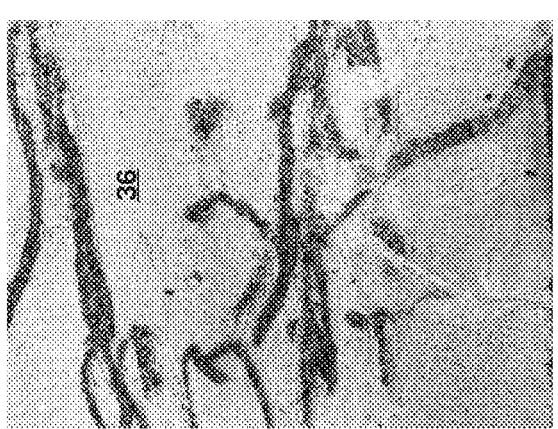
FIG. 3B is a photograph of a second exemplary needle punched nonwoven fabric embodiment.
Figure 3A:
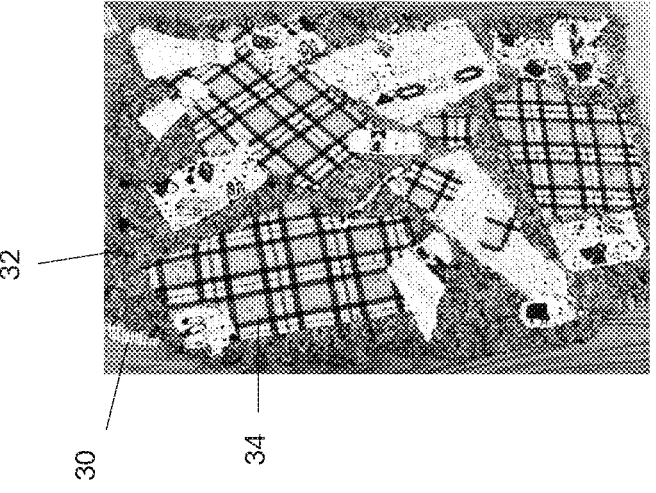
FIG. 3A is a photograph of a first exemplary needle punched nonwoven fabric embodiment.

Exemplary needle punched nonwoven fabric samples made with a needle felting machine are shown in FIGS. 3A-3C. The bottom layer 30 in FIG. 3A is fabric cut from an end-of-use garment, the middle layer 32 in FIG. 3A is recycled textile fiberweb, and the top layer 34 comprises hand-cut shreds. FIG. 3B shows batting material as described herein as top layer 36 and FIG. 3C shows a top layer 38 comprised of shredded textiles from end-of-use garments cut using a textile shredder machine.

Woven Fabric

Figure 4:
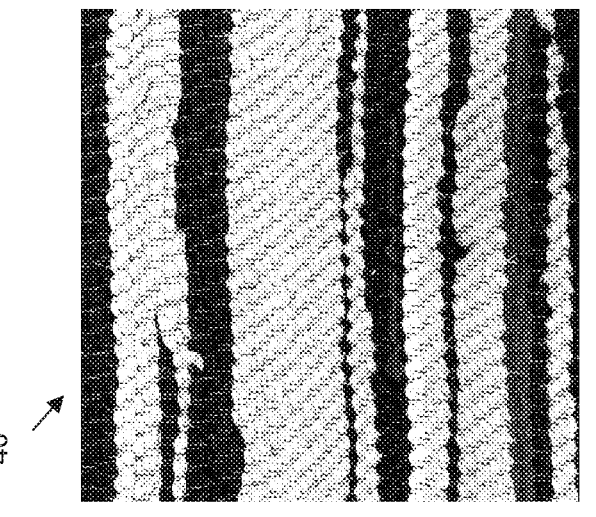
FIG. 4 is a photograph of an exemplary woven fabric embodiment.

One method for developing a woven fabric includes using a Macomber Add-a-harness floor loom (Macomber Looms, York, ME). In an embodiment, the warp yarn was new yarns such as Perle Cotton 10/2, Nautical Blue purchased from the Woolery (woolery.com). The weft/fill "yarn" was 100% cotton woven or knit narrow (e.g. ¼-1 inch wide) textile strips cut from 100% cotton end-of-use garments. Another method for developing a woven fabric includes using a frame loom. In an exemplary frame loom weaving process, the warp yarn was 100% new yarn (white color), and the filling yarn was the ribbon cut end-of-use cotton apparel. An exemplary woven fabric as described above is shown in FIG. 4.

Confetti Quilt

Figure 2A:
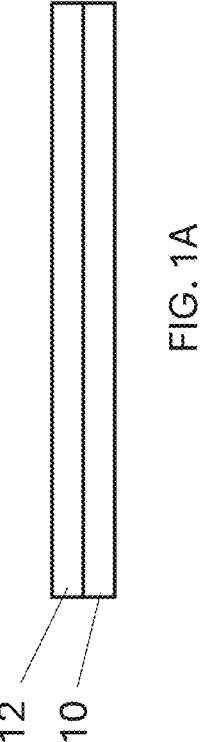
FIG. 2A is a schematic side view of an exemplary 3-layer textile stack relating to another embodiment of the invention.
Figure 2B:
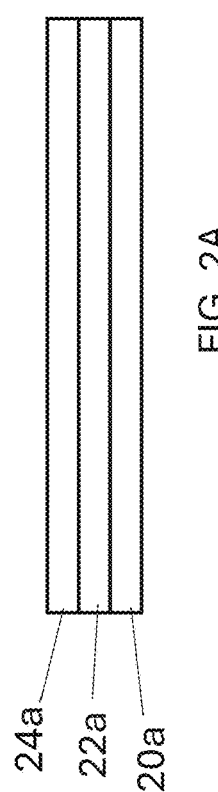
FIG. 2B is a schematic side view of an exemplary 4-layer textile stack relating to yet another embodiment of the invention.

In other embodiments, a confetti quilting process may be undertaken using shreds from end-of-use garments. Two ways of developing confetti quilting fabric were explored: (a) with a large piece of fabric as a base, and (b) without a large piece of fabric as a base. Referring to FIG. 2A as a 3-layer textile, generally, in an embodiment with base fabric, the shredded small pieces of fabric are placed in a layer 11 on top of a large piece of cotton woven fabric cut from an end-of-use shirt or a 100% cotton muslin fabric waste (leftover fabric from school projects) as layer 10, and then covered water soluble stabilizer (e.g. SULKY® Solvy™ stabilizer) as layer 12. When a base fabric was not used, shredded fabric scraps in layer 11 were disposed two layers 10 and 12 of water soluble stabilizer and pinned. A free-form embroidery technique was used to quilt the fabric with 100% Dual Duty cotton thread and an embroidery presser foot on a Singer professional home machine. Upon completion of the free-form embroidery process the fabric was hand laundered in warm water to remove the water soluble stabilizer.

Figure 5:
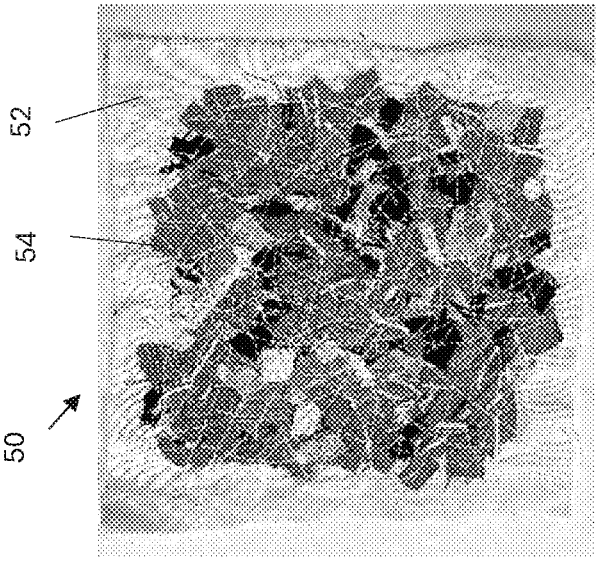
FIG. 5 is a photograph of an exemplary confetti quilt embodiment.

An exemplary confetti quilting textile fabric is shown in FIG. 5. Confetti quilted fabric 50 comprises a base fabric 52 and a top layer 54 comprising shredded fabric "confetti" disposed on the base layer. Including a base fabric provides a more stable and stronger fabric than preparation without a base fabric. The shredded fabric layer 54 was hand shredded with scissors but other embodiments include shreds created by a textile shredder machine.

Loop Tufted Fabric

In yet another embodiment, end-of-use garments may be cut into ¼-inch strips and used as tufting yarns (e.g. with scissors or with a rag cutter, such as a Bliss Model A rag cutter). The tip of each strip was inserted into the tufting machine with a metal hook. One embodiment included tufting in vertical lines of 18 inches into a 100% cotton open weave cloth, sup-ported by an 18-inch×18-inch wooden frame. Sample fabrics were cut to size and secured with a zigzag stitch using 100% cotton Dual Duty thread, sewn on a Singer professional home sewing machine. The back of the tufting sample was glued, and a 100% cotton muslin cloth (leftover textile fabrics from school projects) was applied.

Tufting

Figure 6:
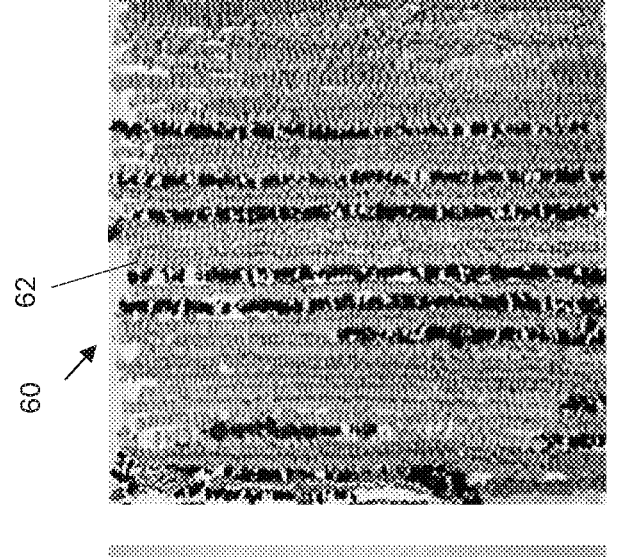
FIG. 6 is a photograph of an exemplary loop tufted textile embodiment.

End-of-use cotton products with different colors may be cut into narrow strips (e.g. "yarns" as described herein above) and tufted onto an end-of-use cotton fabric. An exemplary loop tufted textile samples is shown in FIG. 6. Fabric strips 62 of ¼ inch width were used as the tufting "yarns." Fabric strips with different colors can be used to make tufting color patterns.

Textile Testing

Before yarn and fabric testing, except for the thermal resistance ($R_{ct}$) testing, all samples were conditioned at 21° C. and 65% relative humidity in an Environmental Chamber (Lunaire, Model No. CEO910-4, Thermal Product Solutions, New Columbia, PA) in accordance with ASTM D1776 method (Standard Practice conditioning and textile testing).

Yarn Testing

Researchers tested the tex (g/km), tensile strength, elongation of the yarns to evaluate whether it can be woven or knitted into textile products. To measure the tex data, the weight of 16 inches of the yarn (with three replications) may be measured and converted to g/km (tex).

The tensile strength and elongation were measured in accordance with ASTM D2256 (Standard Test Method for Tensile Properties of Yarns by the Single Strand Method) using a H5KT Benchtop Materials Tester (Tinius Olsen, Horsham, PA). There were three replications of tensile strength and elongation test for each specimen.

Researchers tested the strength and elongation of two types of "yarns": yarns pulled out from an end-of-use multi-color cotton sweater that contains three yarns, i.e., green, grey, and white and ¼-inch fabric strips cut from an end-of-use woven cotton fabric using a Rag Cutter. The tensile properties of the yarns are shown in Table 1. For comparison, research by Ramey et al. reported 184 different "new" cotton yarns' (size 12 tex or 27 tex) tenacity were in the range of 57 mN/tex to 174 mN/tex (0.646 gf/denier to 1.971 gf/denier). See, Ramey, H. H. Jr.; Lawson, R.; Worley, S. Jr. "Relationship of cotton fiber properties to yarn tenacity." *Textile Research Journal* 47, 685-691 (1977). The tenacity of yarns pulled out from end-of-use cotton garments are comparable to the tenacity of "new" cotton yarns. This indicated the wear and care of the used sweater and the process to pull yarns out of sweater did not significantly weaken the yarns. Yarns pulled out from end-of-use sweater can be re-used in textile development.

TABLE 1

Tenacity and Elongation of yarns pulled
out from an end-of-use sweater

| | Tex | Breaking force (kgf) Mean ± SD | Tenacity (gf/denier) Mean ± SD | Elongation (%) Mean ± SD |
|---|---|---|---|---|
| Green yarn pulled from an end-of-use knitwear | 73 | 1.173 ± 0.060 | 1.785 ± 0.092 | 12.79 ± 0.33 |
| Grey yarn pulled from an end-of-use knitwear | 49 | 0.406 ± 0.029 | 0.921 ± 0.067 | 11.85 ± 1.63 |
| White yarn pulled from an end-of-use knitwear | 122 | 0.923 ± 0.106 | 0.840 ± 0.097 | 16.59 ± 1.50 |
| ¼ inch wide woven fabric strip | 1443 | 3.535 ± 0.730 | 0.272 ± 0.056 | 23.48 ± 0.94 |

The size (tex number) of the ¼-inch cotton fabric strip was much higher than machine spun yarn. Ramey et al. reported yarns for both lowest tenacity (57 mN/tex) and highest tenacity (174 mN/tex) having a diameter of 27 tex. The ¼-inch cotton fabric strip has a tenacity of 0.27 gf/denier, which is smaller than the lowest tenacity (57 mN/tex or 0.646 gf/denier) reported by Ramey et al. The low tenacity may be caused by the much bigger size (1443 tex of ¼-inch cotton fabric strips vs. 27 tex). The breaking force of the highest tenacity (174 mN/tex) reported by Ramey et al. was 4.698 N (or 4698 mN=174 mN/tex×27 tex), which was 0.48 kgf. The ¼-inch cotton woven strips' breaking force of 3.535 kgf are much higher than the 0.48 kgf breaking force by Ramey et al. The high breaking force will ensure the ¼-inch cotton woven strips will not be broken in future weaving, knitting or other fabrication (e.g., tufting) processes and can be used as "yarns" in these processes.

Fabric Testing

For the fabric samples, the researchers measured thickness, thermal resistance (Rct), stiffness/softness, and air permeability. The thickness was measured using a portable gauge (SDL Atlas, Rock Hill, SC). There were ten replications for each test.

Rct data was measured by a sweating guarded hotplate (Thermetrics, Seattle, WA) in accordance with ASTM F1868 standard (Standard Test Method for Thermal and Evaporative Resistance of Clothing Materials Using a Sweating Hot Plate). There were three replications for each test.

The stiffness/softness data were measured using a Handle-o-meter (Thwing-Albert Instrument Co., West Berlin, NJ) in accordance with ASTM D6828 standard (Standard Test Method for Stiffness of Fabric by Blade/Slot Procedure). In the test, the slot width was set at 20 mm and a 1000 g beam was used. Each sample was tested in four different directions to calculate the average for one sample.

The researchers measured air permeability data using an Automatic Air Permeability Tester (Model AG18B, Aveno Technology Co., Fujian, China) in accordance with ASTM D737 standard (Standard Test Method for Air Permeability of Textile Fabrics). The sample area in the test was 20 cm2. There were ten replications for each air permeability test.

The researchers measured the thickness, thermal resistance (Rct), stiffness of two needle punched felt nonwoven samples, one woven sample, one confetti quilt sample, AND one tufting sample. The results are in Table 2. The air permeability data of all of these samples indicate these fabrics are breathable and can meet the breathability comfort requirement for wearable products. Three layers of materials were used in the production of needle punched felt nonwoven fabrics, which resulted in thick fabrics. Narrow fabrics cut from end-of-use garments were used as "yarns" in the development of woven fabrics. These "yarns" are much bigger (higher tex) than regular yarns. So, the woven fabric samples are also thick. Due to higher thickness, the fabrics made from needle felting and loom weaving have high thermal resistance and are stiff. These fabrics are appropriate for products that require high thickness and stiffness such as bags and decorative fabrics, and products that provide warmth (require high thermal resistance) such as blankets and winter apparel. The confetti quilted fabric is the thinnest, softest, and has the lowest thermal resistance among the 5 samples. It can be used in apparel products for spring and fall seasons, and to make bags and decorative textile products.

TABLE 2

Fabric thickness, thermal resistance, stiffness, air permeability test results

| Sample | Thickness (Mean ± SD) (mm) | $R_{ct}$ (Mean ± SD) (° C. · m2/W) | Stiffness (Mean ± SD) (g) | Air permeability (Mean ± SD) (mm/s) |
|---|---|---|---|---|
| Needle punched felt sample 1 | 3.04 ± 0.28 | 0.0797 ± 0.0025 | 122.45 ± 3.76 | 423.01 ± 30.71 |
| Needle punched felt sample 2 | 3.32 ± 0.44 | 0.1080 ± 0.0003 | 319.70 ± 20.15 | 333.98 ± 52.18 |
| Woven | 3.96 ± 0.51 | 0.0937 ± 0.0011 | 230.10 ± 3.54 | 694.99 ± 95.69 |
| Confetti quilt | 2.34 ± 0.19 | 0.0430 ± 0.0009 | 77.75 ± 8.58 | 409.79 ± 41.60 |
| Tufting | 8.58 ± 0.39 | 0.0892 ± 0.0034 | >1000 | 313.38 ± 61.29 |

In addition, the researchers measured the thickness of two loop tufted textile samples having thicknesses of 7.816 mm (SD=0.747) and 8.535 mm (SD=0.419). Their stiffness for both was higher than 1000 g (above the 1000 g test range of the Handle-O-Meter). Thus, the loop tufted fabrics may be considered very thick and stiff, making them more suitable for rugs and decorative textiles than apparel products, which typically require better bending and flexibility, e.g., in elbow and knee areas.

Products

The fabrics as described herein may be used to make products, such as protective cases for mobile phones and eyeglasses; bags, such as but not limited to handbags, makeup bags, tote bags, and carryall, such as backpacks; and wearable apparel, such as but not limited to jackets and hats.

Cotton Mulch Mats for Weed Control

Agrotextiles are textiles used for agriculture, horticulture, fishing, landscape, animal husbandry, aquaculture, gardening, forestry, and agro engineering. A specific type of agrotextile—mulch mats—are used in agriculture, horticulture, and floriculture. Mulch mats can inhibit weeds, maintain soil hydration, control temperature and frost effects, stabilize and help the separation of soils, reduce nutrient leaching, improve soil organic matter or nutrient content, alter insect and disease pressures, increase soil porosity, and contribute to the germination and growth of plants. Mulch mats typically comprise nonwoven and/or woven textiles made from natural (jute, flax, hemp, coir) or synthetic (polyethylene, polypropylene, polyester) textiles or films. Textile mulch mats have better permeability and flexibility than film mats. Synthetic fibers are not biodegradable and at the end of their use must be removed from the fields and sent to landfills or incinerated, or buried in the agricultural field, any of which may be harmful to the environment. By contrast, natural fibers are biodegradable and provide nutrients to the soil during the biodegradation process to contribute to the growth and survival of plants.

In an embodiment, end-of-use cotton textile products were used for developing biodegradable mulch mats. The researchers collected used cotton (100% cotton and cotton pylene (PP) dual layers fabric, 100% natural burlap (100% jute) fabric, and 100% polyethylene (PE) plastic sheet, were acquired.

The researchers measured thickness, thermal resistance (Rct), and air permeability of the samples. The thickness was measured using a portable gauge (SDL Atlas, Rock Hill, SC). Air permeability was measured by an Automatic Air Permeability Tester (Aveno Technology Co., China) in accordance with ASTM D737 standard (Standard Test Method for Air Permeability of Textile Fabrics). Rct was measured by a sweating guarded hotplate (Thermetrics, Seattle, WA) in accordance with ASTM F1868 standard (Standard Test Method for Thermal and Evaporative Resistance of Clothing Materials Using a Sweating Hot Plate).

The researchers tested the weed control in a vegetable farm in summer. Before the test, the researchers removed weeds from areas of approximately 2-foot×2-foot between the squash plants. The mulch mat samples (10-inch×10-inch) were placed in the field, and the numbers of weeds grown from underneath the mulch mats were counted after approximately 5 weeks. There were 3 or 4 replications for each test. The researchers tested the biodegradation of the mulch mats in a greenhouse. The tests were conducted in pots. The researchers put the 4-inch×8-inch samples in pots and then added soil into the pots. The researchers observed and measured biodegradation (weight loss) after 6 weeks and 10 weeks. There were 3 replications for each sample. The material weight loss after biodegradation was calculated using the following formula:

$$\text{Weight loss} = \frac{\text{weight before biodegradation} - \text{weight after biodegradation}}{\text{weight before biodegradation}} \times 100\% \qquad [1]$$

The results are shown in Table 3.

TABLE 3

| | | | | | Weight loss (%) | |
|---|---|---|---|---|---|---|
| Sample | Thickness (mm) | Air permeability (mm/s) | $R_{ct}$ (° C. · m²/W) | No. of weed | 6 weeks | 10 weeks |
| No mulch mats | — | — | — | 30 to 40 | — | — |
| PP dual layers | 0.853 ± 0.342 | 418.9 ± 28.8 | 0.085 ± 0.002 | 0 | 0 | 0 |
| Burlap | 1.282 ± 0.054 | 9295.0 ± 711.6 | 0.038 ± 0.001 | 18 ± 10 | 78.0 ± 25.7 | 52.5 ± 24.9 |
| PE sheet | — | — | — | 0 | 0 | 0 |
| Cotton blend nonwoven | 3.202 ± 0.654 | 294.80 ± 9.78 | 0.103 ± 0.007 | 0 | 29.9 ± 7.0 | 42.8 ± 5.8 |
| 100% cotton nonwoven | 3.330 ± 0.463 | 321.13 ± 38.90 | 0.093 ± 0.001 | 0 | 51.6 ± 23.4 | 67.8 ± 5.2 | blends with more than 80% cotton fiber) apparel products that were deemed unfit for sale in local Goodwill stores and shredded them in four passes using a textile shredder (Taskmaster® Model TM8512). After carding a mixture of fabric shreds and a small amount of new cotton fibers to develop batts and using end-of-use cotton fabric as the supporting material, researchers developed needle punched nonwoven fabrics using a FeltLOOM® needle felting machine (Model Lexi, Feltloom, Sharpsburg, KY). The samples were felted 4 times to make the nonwoven mulch mats. For comparison, three commercial weed control fabrics, i.e., 100% polypro- The nonwoven mulch mats made from cotton textile waste were thicker than commercial mulch mats. Due to the high thickness, the nonwoven mulch mats made from cotton textile waste had lower air permeability than the commercial PP dual-layer mulch mats. The two mulch mats made from cotton textile waste have higher thermal resistance than commercial PP dual layers and burlap mulch mats, indicating nonwovens made from cotton waste can better maintain soil temperature. The nonwoven mulch mats made from cotton waste completely inhibited weed growth, which was significantly better than commercial burlap mulch mats and was similar to the two commercial synthetic mulch mats. The nonwoven mulch mats made from cotton waste showed significant biodegradation within 10 weeks, which was significantly faster than commercial synthetic mulch mats and comparable to commercial burlap mulch mats. Nonwoven made from 100% cotton waste also had better biodegradability than nonwoven made from cotton blend (>80% cotton) waste. The two commercial synthetic mulch mats did not biodegrade at all. Notably, the weight loss data in Table 3 is underestimated due to soil and dirt attached on the mulch mat materials. As a reference, the PP dual layers had as high as 80-90% weight "gain" after the biodegradation test due to the higher density of soil and their rough texture to shed soil. The PE plastic sheet had about 8-9% weight "gain" after the biodegradation test due to their relatively smooth texture.

Additional details regarding mulch mat embodiments are discussed in the examples, below.

EXAMPLES

Example 1: Mulch Mats

The researchers purchased two commercial mulch mats, one synthetic fabric and one natural fabric, from Amazon. The synthetic fabric is Crystallove Premiun 5 oz Weed Barri-er Landscape Fabric (100% polypropylene (PP), dual layers, 142 g/m2). The natural fabric is Growneer Natural Burlap (100% jute) Weed Barrier Fabric. The researchers also acquired a commercial polyethylene (PE) plastic sheet that was used to control weeds in the University of Delaware vegetable farm.

The researchers collected used apparel products deemed unfit for sale in Goodwill stores from Goodwill of Delaware and Delaware County (Goodwill DE). After collection, the researchers sorted these products and selected the products that have 100% cotton content or high cotton content blend (cotton and synthetic fiber blends with more than 80% cotton content). The researchers removed non-textile materials such as zippers and buttons from the end-of-use garments and saved some larger pieces of the fabrics suitable for use as support layers in the nonwoven textile to be developed. The researchers used a textile shredder Taskmaster® Model TM8512 textile shredder (Franklin Miller Inc., Livingston, NJ) to shred the rest of the fabric. The fabrics were shredded 4 times.

In the first trial, the researchers used a mixture of 50 g textile shreds and 13.6 g new cotton fibers in the nonwoven development. The cotton shreds were shredded scraps from cotton blend shirts (samples No. 8 and 12) and 100% cotton shirts (samples No. 10 and 13). The researchers carded new cotton fiber slivers on a Strauch carding machine to develop batting materials. The needle punched nonwoven fabric was developed using a FeltLOOM® needle felting machine (Model Lexi, Feltloom, Sharpsburg, KY). A stack of three layers was fed to the needle punched process, as shown in FIG. 2A: a single piece of fabric 20a from end-of-use garment as the backing or support layer, one or more layers 22a of fabric shreds laid on top of the backing layer, and a layer of batting 24a made from new cotton fiber slivers disposed on top of the fabric shred layer. In this process, the cotton fabric shreds were sandwiched between a continuous piece of fabric and a new cotton fiber batting and could pass through the needle felting machine. The needle punched process included passes through the needle felting machine of at least 4, and up to 16 times (1 or 4 times in each direction of the fabric).

The experimental nonwoven mulch mats were created in a 2×2 experimental design having two independent variables: (a) fiber content (>80% cotton blend or 100% cotton) and felting times (4 or 16). Table E1 shows the nonwoven mulch mat development parameters using end-of-use shirts as backing.

TABLE E1

| No. | Shreds fiber content | Times through felting machine |
|---|---|---|
| 8 | Cotton blend | 4 |
| 10 | 100% Cotton | 4 |
| 12 | Cotton blend | 16 |
| 13 | 100% cotton | 16 |

In the second trial, the researchers developed nonwoven mulch mats using a stack comprising a backing layer 20b of 100% cotton cheesecloth backing rather than an end-of-use cotton shirt backing 20a. The cheesecloth mulch mats mimic Samples 8, 10, 12, and 13 as in Table E1 with a few changes. The first change being a decrease in the amount of new cotton fibers used from 13.6 g to 8 g. In order to balance the ratio of new cotton fibers to end-of-use cotton shreds, the amount of shreds used in layer 22b increased from 50 g in layer 22a to 70 g in layer 22b. The felting process also changed due to the difference in felting cheesecloth versus a shirt fabric. In order to feed the mulch mat through the felt loom, the bottom cheesecloth layer 20b was placed on top of a thicker fabric (not shown). Then the shred layer 22b comprising 70 g of shreds and a batt layer 24b made from 8 g of new cotton fibers were placed on top of the cheesecloth layer 22b. Finally, another layer of cheesecloth 26b was placed on top to secure the mat and hold all of the materials together. For Cheesecloth Samples 8c and 10c, the mat was felted four times, then the mat was removed from the thick fabric backing and flipped over. The mat went through the felt loom four more times on its backside for a total of eight felting times. For Cheesecloth Samples 12c and 13c, the same materials and procedures were used, but the mats were felted eight times on the front side, then flipped and felted eight more times on the back side for a total of sixteen times felted. Table E2 shows the nonwoven mulch mat development parameters for the nonwoven mulch mats using cheesecloth as backing.

TABLE E2

| No. | Shreds fiber content | Times through felting machine |
|---|---|---|
| 8c | Cotton blend | 8 |
| 10c | 100% Cotton | 8 |
| 12c | Cotton blend | 16 |
| 13c | 100% cotton | 16 |

The researchers measured thickness, thermal resistance ($R_{ct}$), moisture management, air permeability of the samples. Before fabric testing, except for the thermal resistance (Rct) testing, all samples were conditioned at 21° C. and 65% relative humidity in an Environ-mental Chamber (Lunaire, Model No. CEO910-4, Thermal Product Solutions, New Columbia, PA) in accordance with ASTM D1776 method (Standard Practice conditioning and textile testing).

The thickness was measured using a portable gauge (SDL Atlas, Rock Hill, SC). There were ten replications for each test.

Air permeability data was measured by an Automatic Air Permeability Tester (Aveno Technology Co., China) in accordance with ASTM D737 standard (Standard Test Method for Air Permeability of Textile Fabrics). In the air permeability test, the air permeable sample area was 20 cm2.

The air nozzle used was a number 4 (4 mm) or number 5 (6 mm) for most of the samples, while a number 9 (16 mm) nozzle was used for burlap commercial mulch mat. There were ten replications for each test.

Thermal resistance (Rct) was measured by a sweating guarded hotplate (Thermetrics, Seattle, WA) in accordance with ASTM F1868 standard (Standard Test Method for Thermal and Evaporative Resistance of Clothing Materials Using a Sweating Hot Plate). There were three replications for each test.

Soil Evaporation Testing

The effect of the mulch mats on water evaporation was tested in the lab using columns of sand as described by Zheng. See Zheng, W. et al., "Plant growth-promoting Rhizobacteria (PGPR) reduce evaporation and increase soil water retention." *Water Resources Research,* 54 (5), 3673-3687 (2018), incorporated by reference. To measure evaporation, a clear plastic column was filled with sand up to 7 cm and the sand was fully saturated with 40 mL of water. The sample (a mulch mat) was placed over the saturated sand and the column was placed on a balance. The weight of the sample was recorded continuously on the balance with a computer every ten minutes till dry (about two weeks).

Soil Infiltration Testing

Column experiments as described by Kaniz were conducted to test soil infiltration. See, Kaniz, F. et al., "Plant growth-promoting rhizobacteria mediate soil hydro-physical properties: An investigation with *Bacillus subtilis* and its mutants." *Vadose Zone Journal,* 22, e20274 (2023), incorporated herein by reference. How the mulch mats may affect water infiltration into the sand columns was tested by infiltrating 20 ml of water over the dry columns of sand covered with a mulch mat. A "water reservoir" with seven evenly distributed needles held in place a few millimeters above the mulch mat was used to infiltrate 20 mL of water and compared to a control without a mat. The columns were recorded with a camera to compare the rates and patterns of infiltration.

Agricultural Field Testing for Weed Control

The researchers tested the weed control in the University of Delaware vegetable farm. The researchers used Manna et al.'s weed population observation method with some modifications to evaluate the cotton waste mulch mats' effects on weed inhibition. See Manna, K. et al. "Effect of nonwoven jute agrotextile mulch on soil health and productivity of broccoli (*Brassica oleracea* L.) in lateritic soil." *Environmental Monitoring and Assessment,* 190, 82 (2018), incorporated herein by reference. The test was conducted in a row of squash plants. Before the test, the researchers removed weeds from areas of approximately 2-foot×2-foot between the squash plants. Five samples, including three commercial mulch mats and two nonwoven mulch mats developed from cotton textile waste, are tested. There are 3 or 4 replications for each test. The samples were cut into the size of 10-inch× 10-inch and placed on the field in which weeds were removed. There were also control areas that did not have mulch mats. The researchers conducted two sets of experiments in summer and fall, respectively. The mulch mat samples were placed in the field, and the numbers of weeds grown from underneath the mulch mats were counted after approximately 5 weeks.

Greenhouse Pot Test for Mulch Mats Biodegradation

The researchers tested the biodegradation of the mulch mats in the University of Delaware greenhouse. The soil burial testing as described by Sülar & Devrin, with some modifications, was used in the biodegradation tests. See, Sülar, V. & Devrin, G., "Biodegradation behaviour of different textile fibres: Visual, morphological, structural properties and soil analyses." *Fibres & Textiles in Eastern Europe,* 27 (1), 100-111 (2019). The tests were conducted in pots. The researchers planned to test the loss of weight and tensile strength, so the sample size of the biodegradation test was 4-inch×8-inch, which is the sample size of tensile strength test for ASTM D5034 (Standard Test Method for Breaking Strength and Elongation of Textile Fabrics (Grab Test)). The researchers conducted two sets of experiments in summer and fall/winter, respectively. There were 3 replications for each sample. In the experiment, the researchers put the samples in pots and then added soil into the pots. The researchers observed and measured biodegradation after 6 weeks and 10 weeks.

Textile Testing Results and Data Analysis

The textile testing results for the two commercial mulch mats and four nonwoven mulch mats made from end-of-use cotton garments are in Table E3.

TABLE E3

| Sample | Thickness (mm) | Air permeability (mm/s) | $R_{ct}$ (° C. · m²/W) |
|---|---|---|---|
| PP dual layer | 0.853 ± 0.342 | 418.9 ± 28.8 | 0.085 ± 0.002 |
| Burlap | 1.282 ± 0.054 | 9295.0 ± 711.6 | 0.038 ± 0.001 |
| No. 8 | 3.202 ± 0.654 | 294.80 ± 9.78 | 0.103 ± 0.007 |
| No. 10 | 3.330 ± 0.463 | 321.13 ± 38.90 | 0.093 ± 0.001 |
| No. 12 | 2.953 ± 0.334 | 185.28 ± 18.42 | 0.070 ± 0.001 |
| No. 13 | 3.000 ± 0.240 | 201.08 ± 25.83 | 0.065 ± 0.0003 |

One-way ANOVA tests were conducted to compare the mulch mats samples. The researchers noticed the air permeability and Rct data of burlap mulch mats were very different than the other 5 samples due to big openings between yarns in the burlap sample, so the ANOVA test for the air permeability and Rct testing results did not include the burlap (only included the other 5 samples). If there were significant differences among the 6 mulch mats samples, a post hoc test (Tukey HSD test) was conducted to find the differences. The results are in Table E4.

TABLE E4

| | F value | P value | ANOVA result Post hoc test (Tukey HSD) result | Note |
|---|---|---|---|---|
| Thickness | 56.53 | <.001 | (PP = Burlap) < (No. 12 = No. 13 = No. 8 = No. 10) | 6 samples |
| Air permeability | 131.69 | <.001 | (No. 12 = No. 13) < (No. 8 = No. 10) < PP | 5 samples (no burlap) |
| Thermal resistance ($R_{ct}$) | 50.861 | <.001 | (No. 13 = No. 12) < (PP = No. 10) < (No. 10 = No. 8) | |

The thicknesses of the two commercial mulch mats were significantly lower than the four nonwoven mulch mats made from cotton textile waste. Due to the high thickness, the nonwoven mulch mats made from cotton textile waste had lower air permeability than the commercial polypropylene (PP) dual layer mulch mats. One mulch mat made from cotton textile waste (No. 8), depicted in FIG. 9A, had significantly higher thermal resistance than commercial PP dual layer mulch mat, while two mulch mats made from cotton textile waste (No. 12 and 13) had significantly lower thermal resistance than commercial PP dual layer mulch mat.

Two-way ANOVA tests were conducted to investigate the effects of the two independent variables, i.e., fiber content (cotton blend and 100% cotton) and felting times (4 and 16), on the textile property. The results (p-value) are shown in Table E5.

TABLE E5

| | Fiber content p-value | Felting times p-value | Fiber content × Felting times p-value |
|---|---|---|---|
| Air permeability | .013 | <.001 | .520 |
| Thermal resistance | <.001 | <.001 | .386 |

For both air permeability and thermal resistance, there was no significant interaction between fiber content and felting times. Fiber content had a significant effect on air permeability and thermal resistance. Non-woven mulch mats made from 100% cotton had significantly higher air permeability and lower thermal resistance than the cotton blend (80% or higher cotton content). Non-woven mulch mats made with 4 felting times had significantly higher air permeability and higher thermal resistance than 16 felting times.

The researchers conducted linear regression tests to investigate the relationship between thickness and textile properties for the nonwoven fabrics made from cotton textile waste. The thickness had a significant effect (p=0.011, r2=0.979) on air permeability of the nonwoven fabric. Increasing the thickness of the nonwoven fabrics made from cotton textile waste increases the air permeability of the fabric. The thickness has no significant effect on thermal resistance (p=0.166, r2=0.696).

Soil Evaporation Tests

Figure 7:
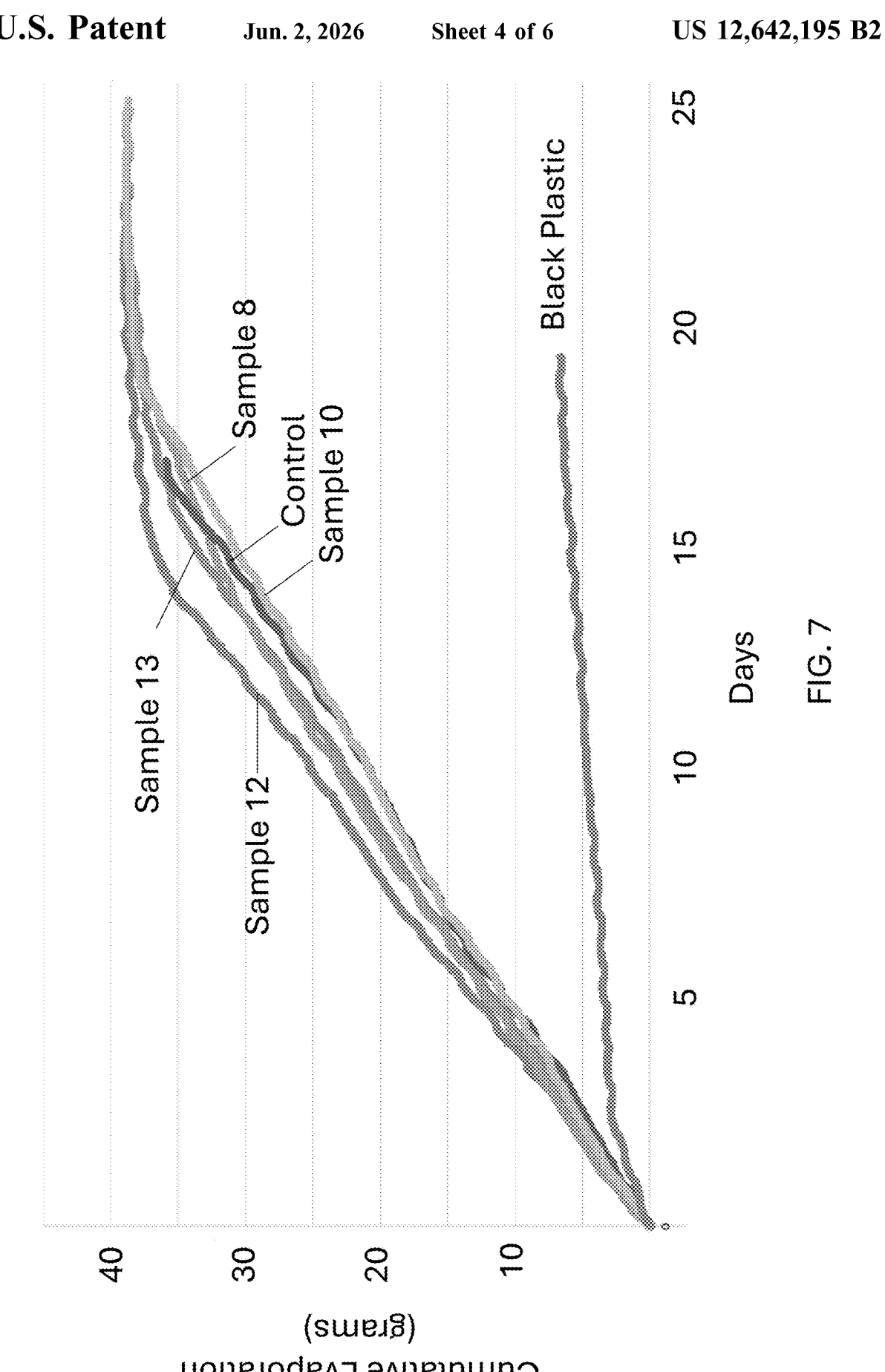
FIG. 7 is a graph of cumulative evaporation over time for a plurality of exemplary mulch mat embodiments.
Figure 8:
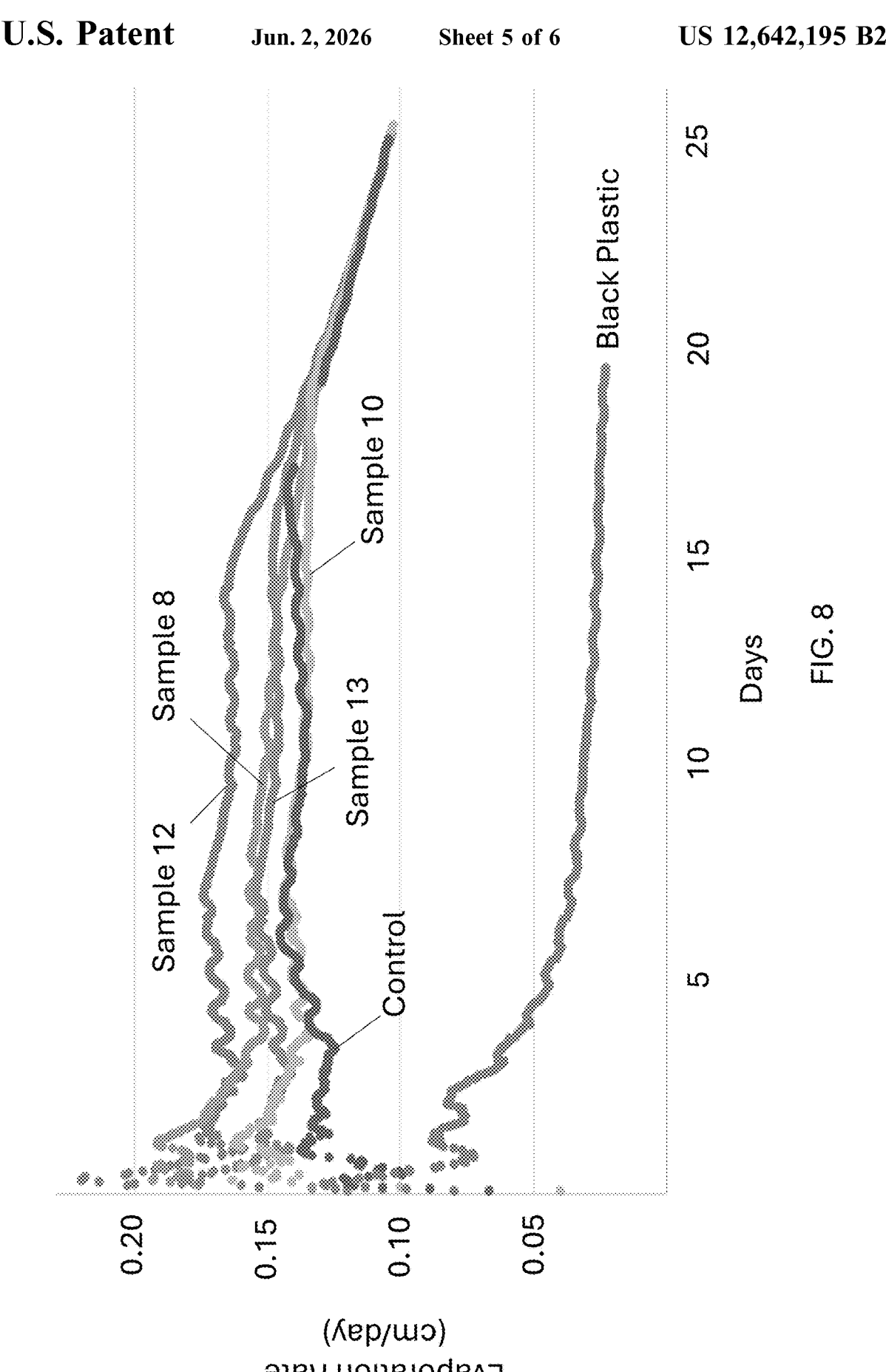
FIG. 8 is a graph of cumulative evaporation rate over time for a plurality of exemplary mulch mat embodiments.

Evaporation tests of samples 8, 10, 12, and 13, a control with no cover, and the polyethylene (PE) plastic sheet were run to compare the evaporation of water from saturated sand with different nonwoven mulch mat coverings. FIG. 7 shows the cumulative evaporation (the total amount of water, in grams, evaporated over the entire testing duration) and FIG. 8 shows the evaporation rate (cm/day) of all samples. The PE plastic sheet resulted in the lowest total cumulative and the lowest evaporation rate of water loss, due to the impermeability of the material. All cotton mulch mats enhanced water evaporation from sand columns compared to the control (no cover). Both of the cotton blend samples (8 and 12) had the highest rate of evaporation initially. Additionally, the two 100% cotton samples (10 and 13) had higher evaporation rates at early times but they were similar to the control, especially the 4-times-felted sample. The higher evaporation loss of water from the cotton-mat-covered sand columns may be due to the enhanced water connectivity in the mulch mats compared to the coarse sand, which have large pores, used in the tests.

Soil Infiltration Tests

The infiltration tests of samples 8, 10, 12, and 13, a control with no cover, and the polyethylene plastic sheet were run to compare the effects of different mats on water infiltration into sand columns. The most significant result was that the plastic sheet completely prevented water infiltration into the sand. This implied that, when used in the field, no rainwater will penetrate the plastic film thus would be lost to surface runoff. When comparing infiltration between the different cotton nonwoven mats with the no-cover control, it was noticed that dry cotton mulch mats initially behaved hydrophobically and slowed down infiltration. When water was added to the column, the water initially collected at the surface and did not infiltrate through the mat. Hydrophobicity was only temporary, however. Once one area of the mat became wetted, water preferentially (or nonuniformly) flowed through the wet or perhaps saturated portion into the column below. This resulted in less uniform water infiltration than with no covering.

Weed Control Tests

Figure 9B:
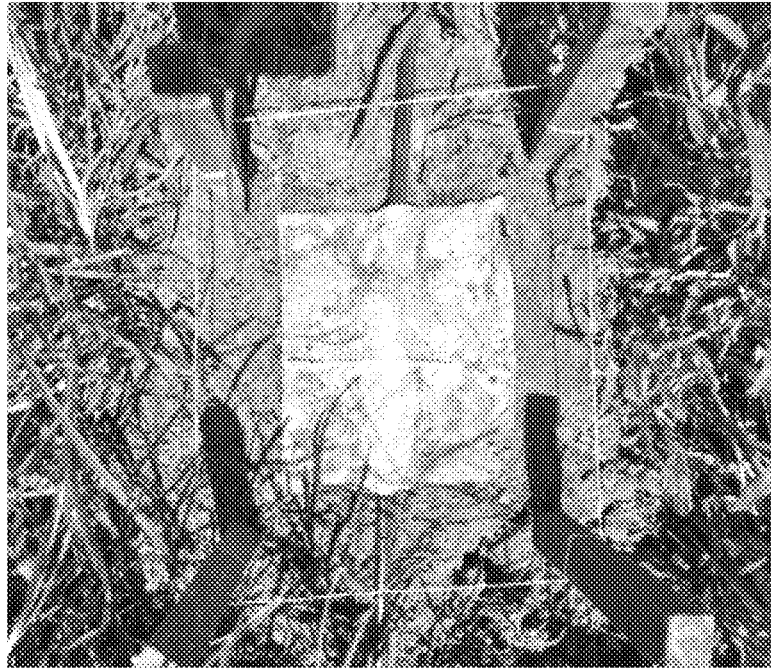
FIG. 9B is a photograph of an exemplary mulch mat embodiment of FIG. 9A disposed on an area of soil.
Figure 9A:
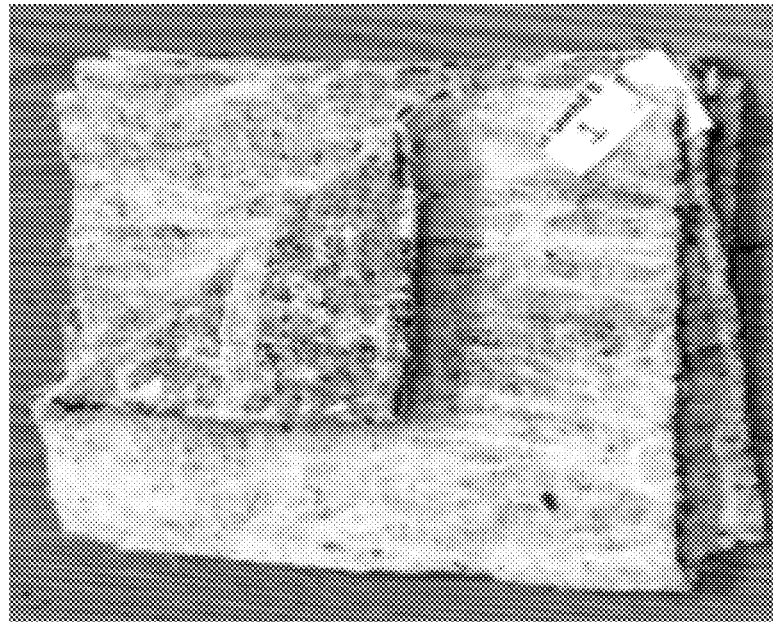
FIG. 9A is a photograph of an exemplary mulch mat embodiment (Sample 8, as described herein).

The researchers conducted two sets of weed control experiments (as generally depicted in FIG. 9B): one in the summer (June to July) and one in the fall (October to November). In the summer experiment, after 5 weeks, the researchers observed weed growth in the field and counted the number of weeds grown from underneath the mulch mat samples. Table E6 shows the results of the number of weeds grown from each sample in the summer experiment.

TABLE E6

| | Sample 1 | Sample 2 | Sample 3 | Average |
|---|---|---|---|---|
| Control | About 30 | About 30 | 30-40 | 30-40 |
| Burlap | 28 | 19 | 8 | 18 |
| PP dual layers | 1 | 0 | 0 | 0 |
| PE plastic sheet | 0 | 0 | 0 | 0 |
| Nonwoven No. 8 | 0 | 0 | 0 | 0 |
| Nonwoven No. 10 | 0 | 0 | 0 | 0 |

The fall experiment started in October and finished in November. The procedure was the same as the summer experiment with the differences being that the final weed count was 5 weeks and 3 days after putting the mulch mats in the field and there were 4 replications. Table E7 shows the results of the number of weeds grown from each sample in the fall experiment.

The control data in Tables E6 and E7 indicate that fewer weeds grew in the fall than in the summer. Using an end-of-use cotton shirt fabric as the backing material (samples 8, 10, 12, and 13), the nonwoven mulch mats made from end-of-use cotton garments can completely prevent the weed growth and have the same effectiveness to control weed growth as the synthetic PP dual layer mulch mats and PE plastic film. The commercial burlap mulch mats have poor weed control due to big openings between the yarns. Using cheesecloth (samples 8c, 10c, 12c, 13c) to replace end-of-use cotton fabric as the backing material, more weeds grew than the nonwoven mulch mat samples, but the weed growth was still significantly less than for the control or burlap mulch mats.

TABLE E7

| | Sample 1 | Sample 2 | Sample 3 | Sample 4 | Average |
|---|---|---|---|---|---|
| Control | 12 | 13 | 23 | 32 | 20 |
| Nonwoven No. 12 | 0 | 0 | 0 | 0 | 0 |
| Nonwoven No. 13 | 0 | 0 | 0 | 0 | 0 |
| Nonwoven No. 8c | 2 | 5 | 5 | 0 | 3 |
| Nonwoven No. 10c | 1 | 4 | 1 | 1 | 1.8 |
| Nonwoven No. 12c | 1 | 1 | 4 | 1 | 1.8 |
| Nonwoven No. 13c | 3 | 1 | 1 | 5 | 2.5 |

Biodegradation Tests

The researchers conducted two sets of biodegradation experiments: one in the summer (July to September) and one in the fall/winter (October to December). In the summer experiments, the researchers tested three commercial mulch mats, i.e., PP dual layer, PE plastic sheet and Burlap, and nonwoven samples 8 and 10. For each mulch mat material, the researchers put 6 samples in pots with soil in July. The researchers evaluated the biodegradation of 3 samples (samples D, E, F) after 6 weeks (took the samples out from the pots in August) and the biodegradation of the other 3 samples (samples G, H, I) after 10 weeks.

After 6 weeks of putting the mulch mat samples into pots, the researchers observed lots of weeds grown in all pots. The researchers took the mulch mat samples out from the soil in the pots and observed significant disintegration of commercial burlap mulch mats and the two nonwoven mulch mats made from end-of-use cotton garments. There was no disintegration of the two synthetic materials, i.e., commercial PP dual layers mulch mats and PE plastic sheets. After 10 weeks, no dis-integration was observed for the two synthetic commercial mulch mats and a more significant disintegration was observed for the three natural material mulch mat samples (burlap and nonwoven samples No. 8 and 10).

Due to the significant disintegration of the three natural material samples, the 4-inch×8-inch sample sizes were not maintained. Thus, the tensile strength tests that were planned to evaluate the biodegradation could not be conducted. The researchers tested the material weight loss to evaluate the biodegradation using the Formula [1] hereinabove.

Due to the significant disintegration of the three natural material mulch mats, washing off the soil and dirt would remove some of the loose textile fibers and yarns, which would result in a higher value of weight loss. The researchers decided not to wash the samples, but to remove as much of the soil and dirt as possible by hand. It should be noted that it was not possible to remove all soil and dirt, which would result in a lower value of weight loss. For all synthetic material mulch mat samples (PP dual layer and PE plastic sheet), the weights after biodegradation tests were higher than the weights before biodegradation tests. In these cases, the researchers report 0% weight loss rather than negative weight loss data. The weight loss data after 6-week and 10-week biodegradation are in Table E8.

to shed soil. The PE plastic sheet also had about 8-9% weight "gain" after the biodegradation test due to their relatively smooth texture.

In the fall/winter experiments, the researchers tested nonwoven mulch mat samples using end-of-use cotton fabric (cut from end-of-use cotton shirts) as backing material, i.e., sample No. 12 and 13, and nonwoven mulch mat samples using cheesecloth as backing material, i.e., sample No. 8c, 10c, 12c, 13c. The re-searchers observed significant disintegration in nonwoven mulch mat samples 8c and 10c and some disintegration in samples 12 and 13, while the least disintegration in nonwoven mulch mat samples 12c and 13c after 6 weeks. After 10 weeks, the researchers observed more disintegration of all these samples than 6 weeks. Significant biodegradation was observed in samples 12, 13, 8c, and 10c, and some biodegradation in samples 12c and 13c. Using cheesecloth to replace end-of-use cotton shirt fabric as the backing material was not expected to affect biodegradation, since samples 8c and 10c had significant biodegradation. One possible reason that samples 12c and 13c have the least biodegradation is that more felting times (16 felting times in these two samples) would make cheesecloth fibers have a higher level of entanglement with end-of-use cotton shreds and less air in the mulch mat materials, which resulted in a slower biodegradation.

In all, the experimental results showed that nonwoven mulch mats made from cotton waste as described herein can significantly inhibit weed growth, significantly better than commercial burlap mulch mats and comparable to commercial synthetic mulch mats. Nonwoven mulch mats made from 100% cotton waste showed significant biodegradation within 10 weeks, which is significantly faster than commercial synthetic mulch mats and comparable to commercial burlap mulch mats.

The nonwoven mulch mats influenced water evaporation and water infiltration into soil as well. The effect on evaporation depends on soil texture. For coarse textured soil such as sand, the multichannel mats are likely to increase evaporation because they can increase water connectivity, thus sustain water flow and evaporation at higher rates. For heavier textured soils that have smaller pores than the mulch

TABLE E8

| | 6 weeks | | | | 10 weeks | | | |
|---|---|---|---|---|---|---|---|---|
| | 1 (D) | 2 (E) | 3 (F) | Avg | 1 (G) | 2 (H) | 3 (I) | Avg |
| PP | 0% | 0% | 0% | 0% | 0% | 0% | 0% | 0% |
| PE | 0% | 0% | 0% | 0% | 0% | 0% | 0% | 0% |
| Burlap | 100% | 49.8% | 84.3% | 78.1% | 25.4% | 57.7% | 74.4% | 52.5% |
| No 8 | 26.8% | 24.9% | 37.9% | 29.8% | 49.3% | 38.1% | 41.1% | 42.8% |
| No 10 | 77.6% | 32.3% | 44.9% | 51.6% | 67.0% | 63.0% | 73.4% | 67.8% |

Data in Table E8 indicates significant biodegradation after 6 weeks and 10 weeks for the nonwoven mulch mats made from end-of-use cotton garments (nonwoven No. 8 and No. 10). The biodegradation of nonwoven mulch mats made from 100% cotton (nonwoven No. 10) was more than those made from cotton blend (nonwoven No. 8). The biodegradation of nonwoven mulch mat No. 10 was comparable to the burlap mulch mat. The commercial synthetic mulch mats (PP dual layers and PE plastic sheet) did not biodegrade at all. It should be noted that the weight loss data in Table E8 are underestimated due to soil and dirt attached on the mulch mat materials. As a reference, the PP dual layers could have as high as 80-90% weight "gain" after the biodegradation test due to the higher density of soil and their rough texture mats, the mats are likely to reduce evaporation rates, thus allow more water retention. Compared to plastic mulch that does not allow water infiltration, the nonwoven mulch mats have the advantage of allowing water infiltration, thus reducing surface runoff and allowing more water from precipitation or irrigation into soil, although water movement may be non-uniform due to the non-uniformity of pores of the mulch mats.

Example 2: Exemplary Products

The textiles as described herein may be used in the manufacture of any type of textile article. The specific embodiments and prototypes as discussed herein are examples only, and aspects of the invention as described herein are not limited to any particular uses.

Cell Phone Cases and Glasses Case

Any of the textiles as discussed herein may be used for making protective cases, such as for cell phones or eyeglasses. For cell phone case prototypes, textile fabrics were developed by two methods, i.e., confetti quilting and the needle punched felt process, as described herein above. The fabrics were cut into rectangles and sewn with a Singer Heavy Duty Sewing machine with white dual duty cotton thread to make cell phone cases. A woven fabric made using the Macomber floor loom was used for a glasses case prototype, but case products are not limited to use of any particular type of textile as discussed herein.

Bags: Handbag, Backpack, Makeup Bags, Tote Bag

The fabrics as described herein may be used to manufacture bags or carryalls, such as bags, handbags, backpacks, makeup bags, tote bags, and the like. In an exemplary prototype, nonwoven fabric made using a needle felting machine as described herein was used to make a handbag. In a prototype example, nonwoven fabrics were cut into two rectangles for the body of the bag and two rectangles for the straps of the bag, and two pockets. Two squares of 1¼" by 1¼" in the bottom of the right and left corner in the rectangles were cut out to make the body of the bag. The top of the bag and the straps were stay stitched. The researcher sewed the straps on the two rectangles that make up the body of the bag in a square and X shape to secure it, and then sewed the pocket on each rectangle on the plaid side of the bag. Lastly, the researcher sewed the side seams and bottom seam of the bag and sewed the squares on the bottom of the bag to give it dimension.

A prototype backpack was patterned via hand flat pattern method. Needle felted nonwoven fabric from end-of-use garments as described herein was used as the face, and the body was made of a post-consumer cotton garment. A zipper sourced from an end-of-use garment was modified by shortening. The bag was sewn on a Juki industrial sewing machine (model DDL-87) with white dual duty cotton thread.

The makeup bag was developed from needle punched felt fabric (made by shredded end-of-use cotton apparel products and new cotton sliver). Two zippers were sourced from two end-of-use garments and creatively matched in one bag. The bag was sewn on a Juki industrial sewing machine (model DDL-87) with white dual duty cotton thread.

A large tote bag was developed using woven fabric. Fabric was serged and bound at the top with end-of-use cotton. Side seams were sewn. A giraffe pattern pocket and straps (from an end-of-use bag) were topstitched. A Juki industrial sewing machine (model DDL-87) and white dual duty cotton thread were used in the sewing.

Hat

Batting was made from machine shredded fabric from end-of-use cotton apparel. The batting was sent through a needle felting machine 10 times in all four 90-degree-offset orientations to produce a needle punched nonwoven textile. The nonwoven textile was cut into a circle and a rectangle. The rectangle was gathered to create fullness and sewn together with the circle fabric using a Singer Heavy Duty Sewing machine with white dual duty cotton thread.

Garments

End-of-use cotton products (with different colors) were cut into narrow strips. The narrow strips were tufted on a cotton monk cloth. The tufted textile was hemmed with ⅛ inch hem with cotton dual duty thread and attached to a denim jacket (end-of-use jacket obtained from Goodwill DE) by hand tacking with thread.

A moto jacket was developed from a flat pattern method applying needle punched felt fabric (made by shredded end-of-use cotton apparel products and new cotton sliver) for front and back bodice. The lapels and collar were toplined with a different needle punched felt fabric. Sleeves were cut from end-of-use cotton leggings. The jacket was sewn on a Juki industrial sewing machine (model DDL-87) with white dual duty cot-ton thread. The jacket has no closures.

CONCLUSIONS

Nonwoven textiles made from end-of-use cotton apparel can be used as biodegradable mulch mats in agriculture, horticulture, and floriculture to control weeds, providing a sustainable solution to the solid textile waste problem that can complete a circular nutrient flow to benefit agriculture.

Aspects of the invention also employed mechanical recycling methods to recycle post-consumer cotton waste to develop high value products, including bags, a hat, garments, cell phone and glasses cases, and decorative textiles from the recycled materials.

Many stakeholders play roles in the circular fashion business. Internal stakeholders that include fashion suppliers (e.g., fiber, yarn and fabric suppliers), retailers (e.g., fashion brands and retailers), clothing manufacturers, product designers (e.g., fabric designers and fashion designers). External stakeholders include consumers, academic institutions (e.g., material researchers, design schools), governments, recycling agents (e.g., clothing recycling agents, charities), and investors. The innovations as described herein have the potential to benefit various stakeholders in the cotton textile and apparel industry to contribute to the circular cotton fashion business.

Fashion suppliers gain access to more recycled materials for yarn and fabric production and may produce and sell high value yarns and fabrics made from recycled textiles. Retailers may offer more high value product lines made from recycled textiles. Clothing manufacturers have access to more high-value yarns and fabrics for manufacturing. Produce high-value apparel and other textile products from recycled textiles. Consumers have more high-value product choices made from recycled textiles. If their clothing donations cannot be sold by charities, the end-of-use garments may be recycled and produced into high value second life products. Academic institutions can partner with product designers to design and develop more high value products from recycled materials. If donated clothing cannot be sold by charities, charities and textile recyclers can work together to recycle end-of-use apparel and produce high value yarns and fabrics for product development.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A process for making a textile, the process comprising the steps of:

a) obtaining a feedstock comprising a quantity of post-consumer apparel, each item of apparel having a desired textile composition and devoid of non-textile materials;

b) shredding the feedstock to obtain textile shreds;

c) providing the textile shreds as a component in at least a first layer of a plurality of stacked layers comprising at least a second layer of supporting material;

d) feeding the plurality of stacked layers through a needle-felting machine in a plurality of passes, the plurality comprising a range of between 4 to 40, wherein the plurality of passes includes at least one pass in each of a plurality of different 90-degree offset orientations.

2. The process of claim 1, further comprising, prior to step (c), carding the textile shreds, or a mixture of the textile shreds and new textile fibers comprising no more than 15%-20% new textile fibers, with a carding machine between 3 to 8 times to form a batting.

3. The process of claim 1, wherein the process of obtaining the feedstock comprises obtaining a mixture of post-consumer apparel and sorting the mixture to obtain a fraction having the desired textile composition, and removing any non-textile materials from the fraction having the desired textile composition, the non-textile materials including one or more fasteners or decorative hardware.

4. The process of claim 1, wherein the step of feeding the stacked layers into the needle-felting machine comprises turning the stacked layers 90-degrees between each set of subsequent passes.

5. The process of claim 1, wherein the plurality of stacked layers further comprises a third fabric layer.

6. The process of claim 5, wherein the first fabric layer comprises a plurality of fabric strips not formed into a batting and the third layer comprises a fireweb layer disposed between the first fabric layer and the second layer of supporting material.

7. The process of claim 1, wherein the supporting layer comprises a singular piece of fabric.

8. The process of claim 7, wherein the support layer comprises a piece of fabric from an end-of-use textile product.

9. The process of claim 7, wherein the supporting layer comprises a fiberweb.

10. The process of claim 1, wherein one or more of the stacked layers, including the second layer of supporting material, comprises cheesecloth.

11. The process of claim 1, wherein shredding the feedstock comprises using a textile shredding machine.

12. The process of claim 1, wherein the plurality of stacked layers comprises at least one layer of new fiber batting.

13. The process of claim 12, wherein the second layer of supporting material comprises cheesecloth, the first layer is disposed between the supporting second layer and the at least one layer of new fiber batting, and another layer of cheesecloth is disposed over the at least one layer of new fiber batting.

14. The process of claim 1, wherein the first layer comprises at least 85 weight % textile shreds derived from the feedstock comprising the quantity of post-consumer apparel, wherein the first layer has a textile composition of at least 80% cotton, is devoid of non-textile materials, and has no more than 15%-20% new textile fibers.

15. The process of claim 14, wherein the second layer of supporting material comprises a singular fabric piece of fiberweb, wherein the fiberweb comprises cheesecloth.

16. The process of claim 14, wherein the textile comprises 100% cotton.

* * * * *